US006428701B1

(12) United States Patent
Mullennix et al.

(10) Patent No.: US 6,428,701 B1
(45) Date of Patent: Aug. 6, 2002

(54) APPARATUS AND METHOD FOR DELIVERING SOLID BIOREMEDIATION MATERIALS

(75) Inventors: Teddy E. Mullennix, Big Bear Lake, CA (US); Douglas C. Cooper, Vancouver (CA)

(73) Assignee: Ennix Incorporated, Paso Robles, CA (US)

( * ) Notice: Subject to any disclaimer, the term of this patent is extended or adjusted under 35 U.S.C. 154(b) by 0 days.

(21) Appl. No.: 09/364,749

(22) Filed: Jul. 30, 1999

(51) Int. Cl.[7] ............................. C02F 3/02; B01D 33/00
(52) U.S. Cl. ..................... 210/606; 210/610; 210/611; 210/620; 210/631; 210/153; 210/154; 210/172; 210/199; 210/916
(58) Field of Search ............................. 210/916, 198.1, 210/199, 631, 153, 154, 172, 620, 606, 610, 611

(56) References Cited

U.S. PATENT DOCUMENTS

| | | | | |
|---|---|---|---|---|
| 4,063,663 A | * | 12/1977 | Larson et al. | 222/198 |
| 4,648,043 A | * | 3/1987 | O'Leary | |
| 4,659,459 A | * | 4/1987 | O'Leary | |
| 4,810,385 A | * | 3/1989 | Hater et al. | |
| 4,925,564 A | * | 5/1990 | Francis | |
| 4,964,185 A | * | 10/1990 | Lehn | 134/93 |
| 5,271,193 A | * | 12/1993 | Olsen et al. | 52/169.7 |
| 5,578,211 A | | 11/1996 | Dickerson | 210/601 |
| 5,770,079 A | * | 6/1998 | Hease | 210/150 |
| 5,788,841 A | | 8/1998 | Dickerson | 210/610 |
| 5,792,342 A | * | 8/1998 | Heller | |
| 5,799,688 A | * | 9/1998 | Gene | 137/505.13 |
| 5,833,864 A | * | 11/1998 | Miller et al. | 210/724 |
| 5,885,446 A | * | 3/1999 | Henry, Jr. | 210/198.1 |
| 5,948,269 A | * | 9/1999 | Stone | |

OTHER PUBLICATIONS www.ennix.com—"Municipal Waste Systems" downloaded and printed Sep. 22, 2000.*
Letter from Talguin Electric Cooperative to Ennix Inc., Dated Oct. 15, 1998, Published at www.ennix.com (Downloaded Sep. 22, 2000).*

* cited by examiner

Primary Examiner—Chester T. Barry
(74) Attorney, Agent, or Firm—Robert Buyan; Stout, Uxa, Buyan & Mullins, LLP

(57) ABSTRACT

Bioremediation of waste water traveling through a sewer system is accomplished by suspending in selected manholes a self-powered feeder device for delivering a desired amount of a solid microbial wastewater treatment preparation. The feeder device is preferably a) sealed to prevent moisture from causing caking or clumping of the solid microbial treatment preparation, b) controlled by a programable microprocessor and c) powered by a self-contained battery pack that allows the device to function for a desired period of time without maintenance or manual handling. Thus, the device performs automatically, maintains a flowable supply of the microbial treatment preparation and delivers a metered quantity of such microbial treatment preparation into waste water at a selected rate or at selected intervals, and at a treatment location that is upstream of a site where odor or grease build-up have become a problem, irrespective of whether the selected treatment site is devoid of electrical power, above-ground storage structure(s) and/or water supply.

40 Claims, 10 Drawing Sheets

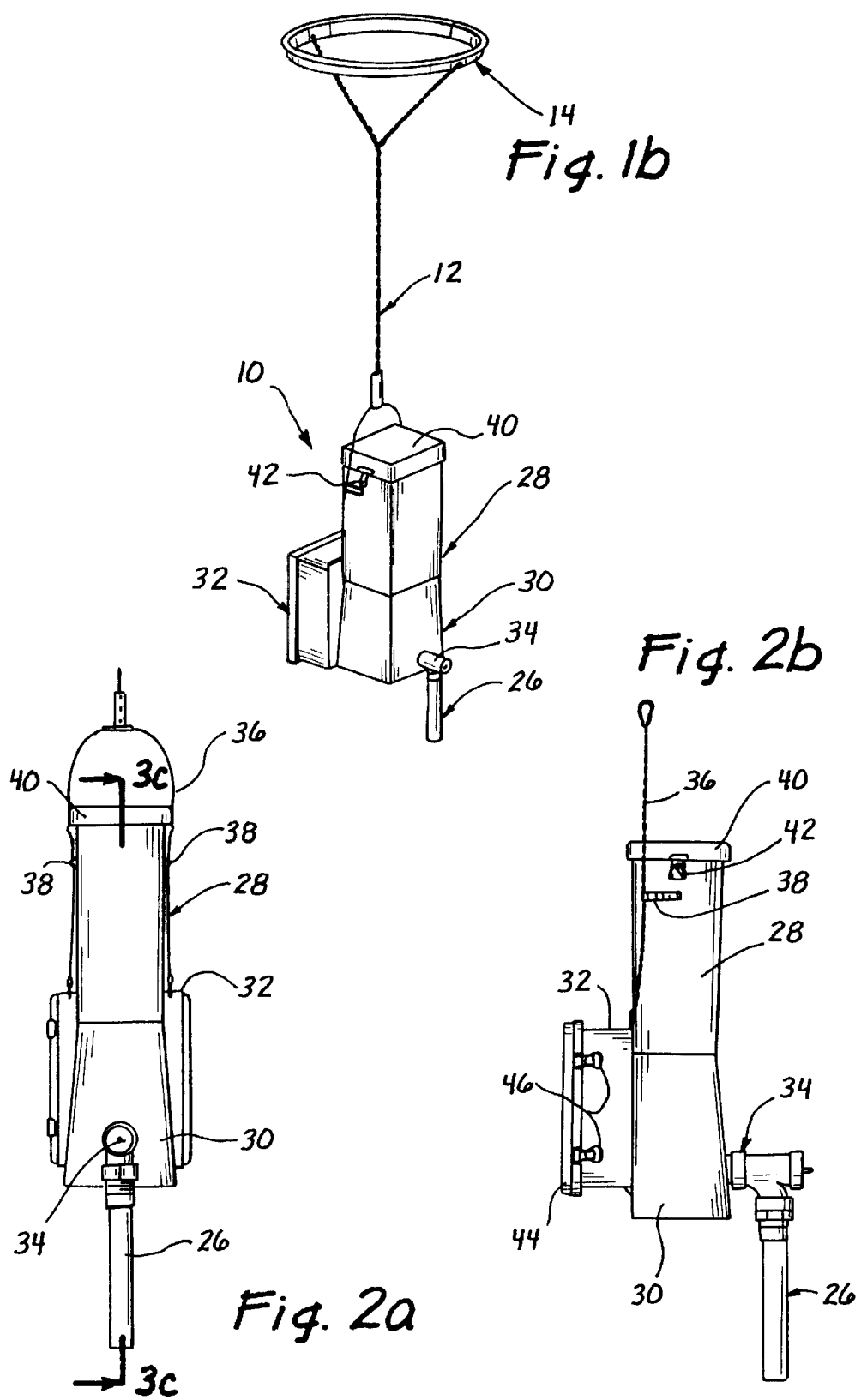

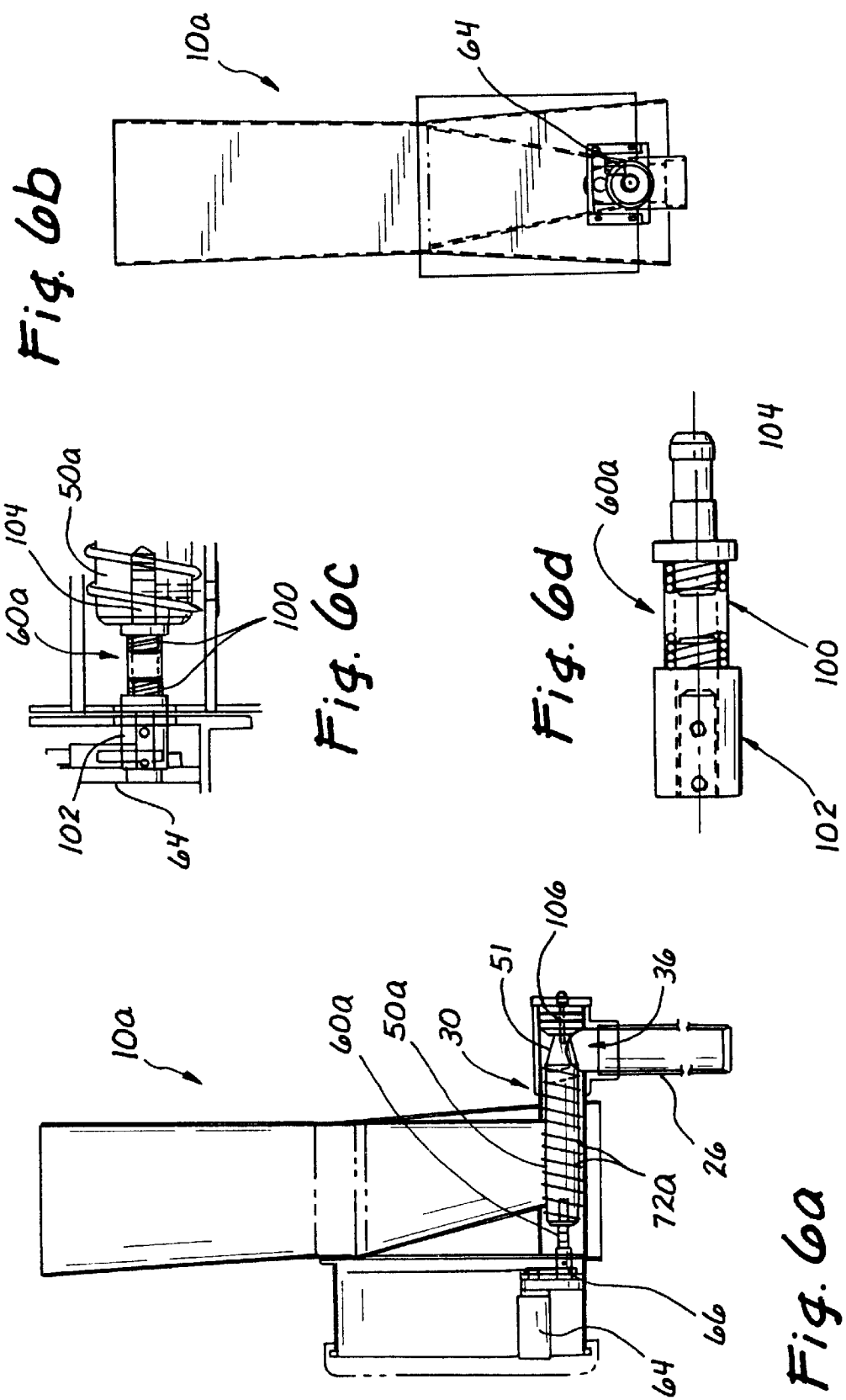

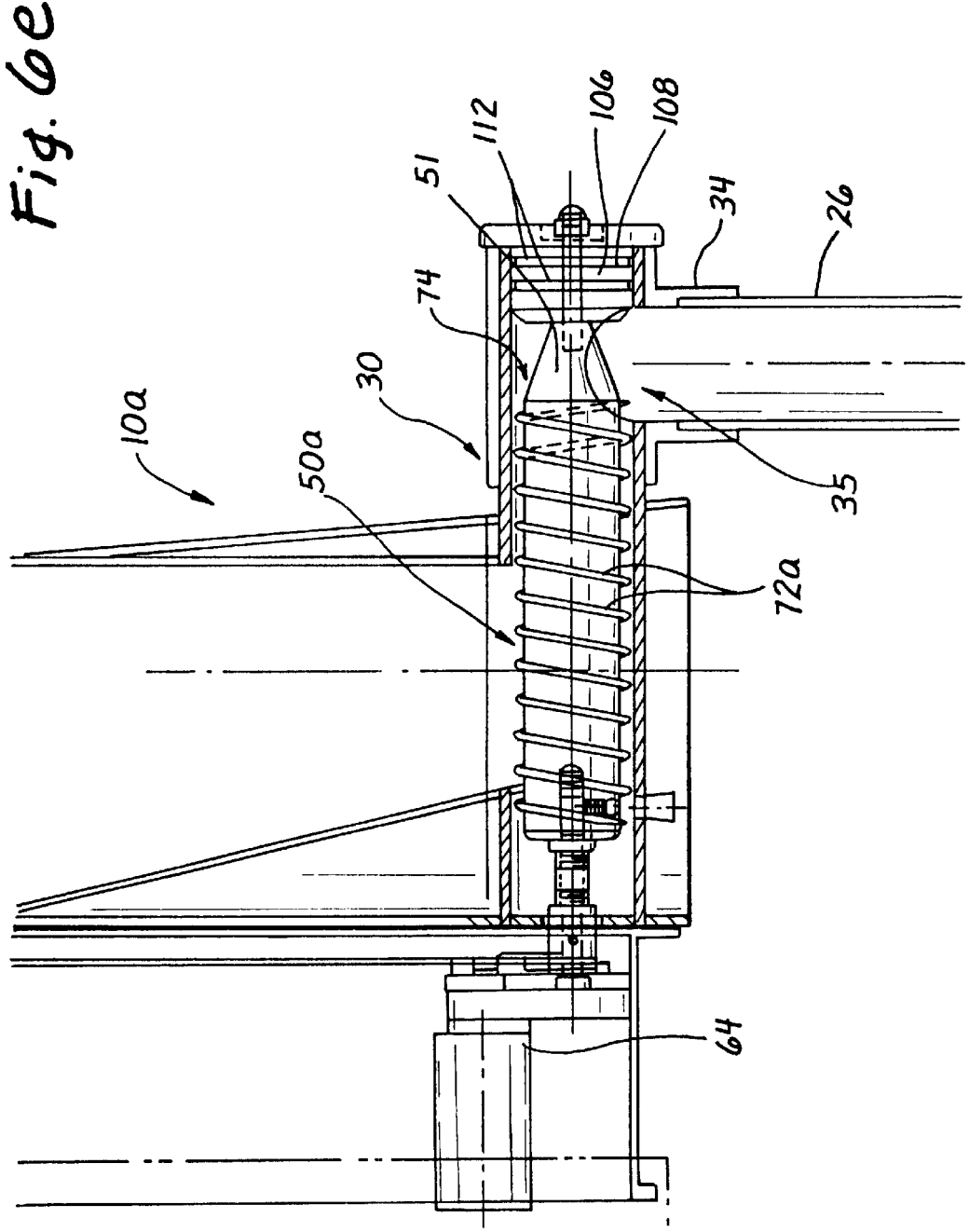

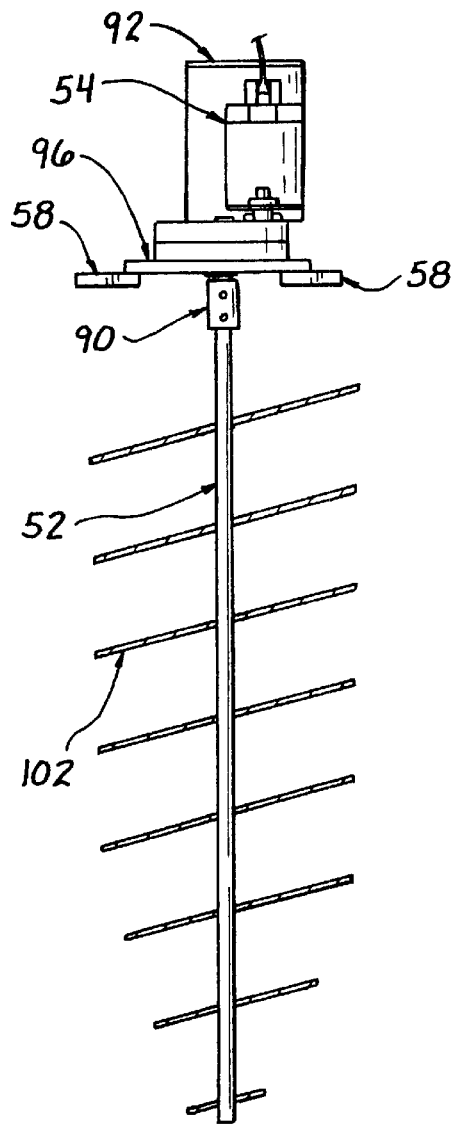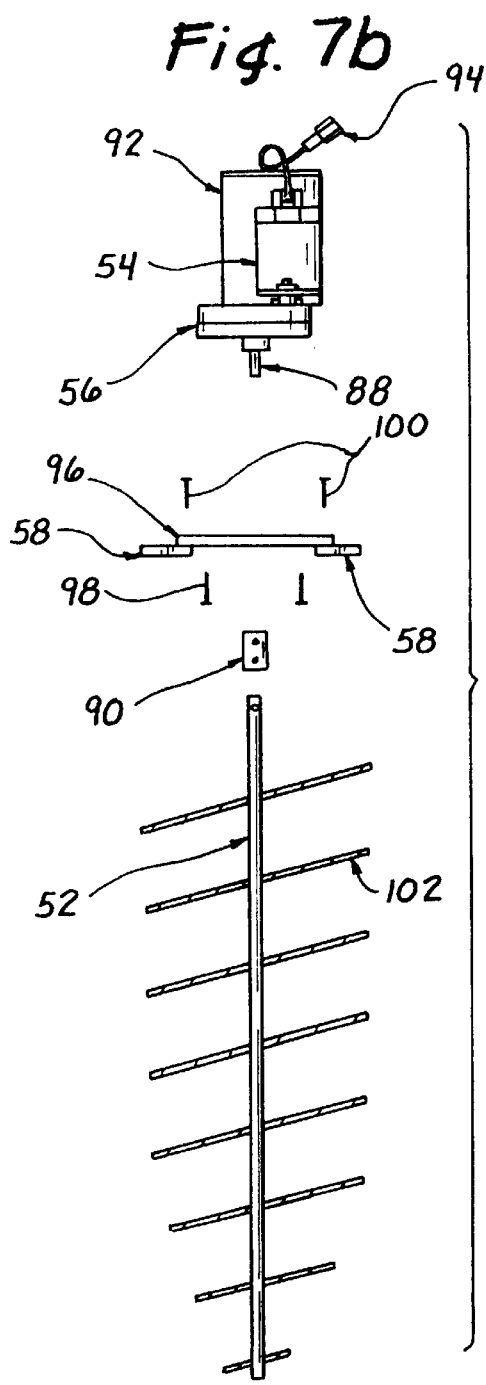
Fig. 7a
Fig. 7b

APPARATUS AND METHOD FOR DELIVERING SOLID BIOREMEDIATION MATERIALS

FIELD OF THE INVENTION

This invention relates to bioremediation of wastewater, and more particularly to a method and apparatus for treating wastewater flowing thorough a sewer with a solid or dry bioremediation preparation.

BACKGROUND OF THE INVENTION

Public wastewater collection and treatment systems typically consist of networks of underground pipes and conduits, wet wells, and pumping/lift stations that carry wastewater (e.g., waste from sanitary sewer systems) to a wastewater treatment plant. After entering the treatment plant, the wastewater is commonly subjected to primary, secondary and tertiary treatment processes to remove solid matter and other substances from the wastewater.

Public wastewater collection and treatment systems can be subject to a number of expensive and noxious problems. Such problems typically result from or consist of a) build-up of congealed grease or organic matter within pipes or other conduits, b) the formation of grease layers known as "mats" on the surfaces of wastewater that pools within wet wells or lift stations; c) anaerobic septic conditions, d) bad odors due to the production of hydrogen sulfide and/or other gasses, e) acidic corrosion due to hydrogen sulfide gas, and f) disease-causing bacteria. If left unchecked, these conditions can cause expensive pipe and equipment damage, pipe blockages, backed up sewer lines, raw sewage spills and health problems in humans and/or animals within the community.

Various methods of coping with these problems have been tried in the past. The following are examples of such prior methods of coping with these problems:

i. Mechanical Dislodgement or Purging of Obstructions

Various mechanical processes have been used to dislodge and remove built-up coatings of congealed grease, sludge deposits, oil and soap in sewer lines and lift stations. The mechanical processes include the use of water pressure jets, vacuum trucks, "roto-rooting" and a process known as "pigging" or "balling" where a ball is forced and/or pulled through the wastewater line. These mechanical processes are high in labor, equipment and removal costs. The dislodged pieces of material have to be collected and taken to a disposal site.

ii. Chemical Treatments

Solvent and enzyme products can be used to liquefy and disperse the grease. The required products are costly. This method often times does not reduce the oil and grease in the collection system, but merely passes the problem downstream as the oil and grease may tend to re-solidify, thereby re-coagulating in pipes and pump stations or re-forming in the wastewater treatment plant.

Chemicals such as calcium nitrate, sodium nitrate, chlorine, hydrogen peroxide, caustic soda, lime and iron salts can be used in the short-run to control the bacteria and other conditions responsible for the generation of odorous and corrosive hydrogen sulfide gas. The use of chemicals in sufficient quantities in the long-run is not only very expensive, but there are operational and safety problems. Chemicals can kill the beneficial microorganisms which are the heart of the waste treatment plant, and create ecological problems beyond the plant. However, the currently available chemical storage and delivery apparatus useable for this purpose typically require an above-ground storage structure as well as a source of electrical power, which may be unavailable at many locations in a municipal wastewater treatment system. Moreover, chlorine is highly toxic and can form hazardous compounds such as trihalomethanes (THMs) which are known carcinogens. Hydrogen peroxide is an oxidizing agent less harmful than chlorine, but it has safety and handling issues. The same applied to caustic soda and iron salts, which are corrosive in their own right and can damage plant and equipment like the hydrogen sulfide gas they are supposed to mitigate.

iii. Microbiological Treatments

Another approach involves the use of naturally occurring beneficial microorganisms and catalysts or biostimulation additives (e.g. mixtures or complexes of vitamins, amino acids, enzymes, minerals, organic acids and nutrients) that can stimulate the growth of aerobic and facultative microorganisms indigenous to the system or those aerobic and facultative organisms that are being added to the wastewater stream. These additions of catalysts and microorganisms are meant to establish a more balanced flora or indigenous microbial growth in the system, to remove slime layers populated by anaerobic microorganisms and to remove decomposing organic waste material both of which cause or are caused by septic conditions from which hydrogen sulfide and other odorous compounds are generated. The use of bioremediation and/or bioaugmentation products can also deter the formation of grease and organic material build-ups before such build-ups can cause obstruction of the wastewater collection system. Results achieved by removing anaerobic slime layers, organic material and congealed grease, oils and soap build-up can be a reduction or elimination of both dissolved and gas phase hydrogen sulfide and other noxious odors, reduction or elimination of build-up of organic deposits resulting in faster wastewater flow through the piping, reduction or elimination of acidic corrosion of pipes, manholes, wet wells and equipment and cleaner wastewater with a higher level of dissolved oxygen. The results are a dramatic drop in noxious odors, reduced or eliminated buildup of organic deposits, cleaner wastewater with a higher level of dissolved oxygen, faster flow through pipes, and control of costly acidic corrosion due to hydrogen sulfide.

This approach, known as bioremediation, requires the introduction of microorganisms and bio-stimulators at a controlled rate into the waste water collection system. This has previously been done by spraying, pumping or otherwise delivering a liquid microbial solution into the collection system at various points such as wet wells and pumping stations. Liquid solutions, however, have a limited shelf life and require above ground storage as well as the availability of a power source, such as an electric outlet in the immediate vicinity of the solution-dispensing location. Additionally, not all microorganisms that are desirable in bioremediation can be prepared in a stable, liquid solution.

Dry bioremedial powders have been developed to greatly increase shelf life, and the variety of beneficial microorganisms that may be included in the treatment, however the use of these dry bioremedial powders in the field has been limited due to the lack of a dispensing apparatus capable of withstanding the high-humidity, corrosive atmosphere of the waste water collection system, and capable of keeping the powder dry to prevent caking and to assure reliable operation for extended periods of time without an external power source.

iv. Methods and Apparatus Previously Used for Delivering Chemical and/or Microbiological Treatments to Wastewater In addition to manual distribution, various other methods and apparatus have heretofore been used for delivering liquid and dry biological or chemical treatments to wastewater at various locations in the wastewater collection/treatment system.

A. Peristaltic Pumps and Gravity Drip Systems for Adding Liquid Biological and Chemical Treatments Liquid biological and enzyme products (e.g., Neozyme™ and Microbac™) useable for controlling grease build-up, as well as certain liquid bio-stimulants (e.g., Bioprime™, Neozyme™ and BioCatalytics™) that purportedly are useable for odor control, can be delivered into flowing wastewater streams at wet wells, lift stations or pumping stations. Peristaltic pumps typically require a separate source of electrical power and liquid preparations typically require above-ground storage, and thus are not suitable for use within a manhole at a remote site away from all electrical power sources. Gravity drip systems can be installed within man holes located at remote sites away from all electrical power sources but such locations typically do not include the above-ground storage facility required to house the liquid treatment preparation being fed to the gravity drip system. Moreover, both peristaltic pumps and gravity drip systems are useable only with liquid biological or chemical treatments and can not be used to deliver solid (e.g., powdered or pelletized) biological or chemical treatments. Also, drip systems are subject to clogging and may not accurately deliver controlled dosages of the liquid.

B. Permeable or Dissolvable Bags for Delivering Dry Biological Treatments

Permeable (e.g., cheesecloth or cotton material) or dissolvable bags or "socks" have been filled with dry biological treatment materials and suspended in areas of the wastewater collection system (e.g., wet wells, manholes) such that the dry biological treatment material is delivered into the wastewater stream. An example of one such permeable bag or sock is described in U.S. Pat. No. 4,810,385 (Hater et al.) Permeable bags typically last only 2–3 weeks. Dissolvable bags can be constructed to last longer than 2–3 weeks. However, neither the permeable nor dissolvable bags have been routinely used in high-flow areas of the wastewater stream (e.g., at manholes located on lateral or trunk lines of the system) because the high flow rate of the waste water causes the dry treatment material to wash out too quickly, the rate of dissolution/dispersion of the treatment material is difficult to control and the use of these permeable or dissolvable bags may be subject to human error (i.e., forgetting to replace the bag).

C. Compressed Masses of Dry Biological Treatment Materials

Dry biological treatment materials have been prepared in dissolvable masses such as compressed bars or pucks that can be submersed in wet wells or sewer pipes to provide slow release of the biological treatment material. These dissolvable masses are not typically used in high-flow regions of the wastewater system, as they would be carried down the sewer pipe by the rapidly flowing wastewater.

SUMMARY OF THE INVENTION

The present invention generally comprises a method and feeder apparatus for feeding predetermined amounts of a dry bioremedial or microbial treatment preparation into a stream of wastewater. The feeder apparatus may be self-powered and sufficiently moisture resistant to be positionable within a manhole or other location that is devoid of electrical power, such that it will feed controlled amounts of the dry microbial treatment preparation into wastewater that is flowing within the manhole. The dry microbial treatment preparation is in a suitable dry form, such as a powder, pellets, paper impregnated with dry microbial matter, dissolvable or frangible packets or bags containing the dry microbial treatment preparation or any other type of dry dosage delivery format. The feeder apparatus may incorporate any suitable type of delivery apparatus for feeding the dry microbial treatment preparation into the wastewater stream. In applications where the dry microbial treatment preparation is powdered or pelletized, the feeder apparatus may incorporate an auger or screw-type feeder that is rotationally driven, continuously or periodically, to deliver the desired doses of the powder or pelletized microbial treatment preparation. Alternatively, in applications where the dry microbial treatment preparation is in the form of a roll of paper whereon or wherein the microbial material is contained (or a roll of interconnected, individual dissolvable or frangible packets containing the dry microbial treatment preparation) the feeder apparatus may comprise a reel and cutter system that operates to continuously or periodically unroll, cut off and release a desired length of a paper, or a desired number of the interconnected packets, into the wastewater stream. Because the feeder apparatus is self-powered, it may be positioned within man-holes or at other locations that are devoid of electrical power sources. This allows the feeder apparatus to be located upstream of a wet well, pumping station, siphon line or other location where odor or grease build up has become a problem. In this manner, the present invention makes practical the widespread use of solid-formulation bioremediation at low cost by providing a self-contained feeder system that delivers dry microbial treatment preparations directly into the waste stream at any location irrespective of the non-availability at that location of electrical power or above ground storage.

Further in accordance with the present invention, there is provided a feeder device of the foregoing character that is capable of automatic, hands-off operation. It dispenses precisely metered amounts of material on a programmable timed basis. The feed times can be programmed for the number of times per day it will feed—the number of events, and the length of time it will feed during the event. Timing is preset for specific flow rates, ambient temperatures, and pollutant levels. The device is preferably sufficiently air and water-tight to be useable in humid, corrosive or hostile environments.

Still further in accordance with the present invention, the feeder apparatus may comprise a housing for storing a solid microbial treatment preparation; an outlet through which the solid microbial treatment preparation may pass out of the housing; a dispensing apparatus arranged to convey the solid microbial treatment preparation from a location the housing and outwardly through the outlet; a motor arranged to drive the dispensing apparatus; a controller programmed to operate the motor for predetermined lengths of time at predetermined intervals and a battery arranged to power the motor and controller. The feeder may also comprise a support apparatus for hanging the feeder from a manhole rim or cover or otherwise mounting the feeder within a manhole.

Further in accordance with the invention, the feeder my be substantially sealed to prevent moisture from causing caking (e.g., clumping) of the solid particulate substance within the feeder. This apparatus may be installed in collection systems at problem lift stations and wet wells, or it may be positioned within a manhole or other site that is a) up-stream of a wet well or lift station, b) devoid of any source of electrical power, and c) in a relatively high-flow or low-flow region of the wastewater collection system. In this manner, the apparatus may be located to efficiently pre-treat the flowing wastewater to prevent the occurrence of odors (e.g., hydrogen sulfide generation) or build-up of matter such as sludge, fats, oil and grease at problem locations such as sewer lines, lift stations or pumping stations. The number and location of the units installed is determined based on collection system layout, pollutant loading data, and historical operating experience. Other pertinent factors such as flow rates, volume/velocity/type of waste, density of high-emission locations (e.g., restaurants that emit grease or industrial plants that emit organic waste) and the nature of local pre-treatment regulations may also be considered and the feeder apparatus may be specifically programed and positioned in light of all such factors.

Still further in accordance with the invention, the dispensing apparatus of the feeder may comprise an auger feed system for conveying the solid particulate substance out of the outlet at a controlled flowrate and/or at controlled intervals.

Still further in accordance with the invention, this apparatus of this invention may be fully self-contained and powered by a 12 VDC battery such that it requires no outside power. Remote control and monitoring may optionally be provided. Also, an optional manhole bracket assembly and suspension tether (e.g., a chain) allow for ease of installation in most manholes. The bracket may be made a corrosion resistant material (e.g., aluminum) and the chain may be made of steel and polycoated to resist corrosion.

The method of the present invention generally comprises the placement of an apparatus of the above-summarized type within a manhole or at some other area of a wastewater treatment system and using the apparatus to deliver a dry biological or chemical treatment material at a controlled flow rate, or in known quantities at controlled intervals. Because the apparatus is self-powered and self-contained it may be placed at a remote location in a fast-flowing wastewater feed line to effect pretreatment of the flowing wastewater before it reaches a wet well, lift station, pumping station or other location at which odor, sludge build-up or grease build-up is a problem.

Further in accordance with the method of the present invention, an apparatus for delivering a dry microbial wastewater treatment preparation may be located at a sufficient distance upstream of the location at which an odor problem or build-up of sludge or grease is detected to substantially prevent the occurrence of such odor problems or build-up of matter. By adding the dry microbial preparation upstream of the actual location at which the odor or matter build-up is perceived, the present invention can deliver a microbiological treatment that will establish an aerobic/facultative digestion cycle in the wastewater lines and lift stations, eliminating grease and organic build-up and deterring the anaerobic environment necessary for growth of sulfur-related bacteria and the resultant generation of $H_2S$ and other odor producing compounds. The feeder apparatus may be programmed to deliver a consistent microbial dose that is sized to the volume of wastewater flow through the line or system, the overall length of the wastewater system and the magnitude of the pollutant load. The feeder apparatus used to deliver the dry microbial preparation may be specifically programmed to vary the amount of the microbial treatment that is being delivered to correspond to variations in the flow rate or volume of the wastewater passing through the conduit and/or variations in the pollutant load contained within the wastewater. Healthy microbial colonies are thus established in the piping and wet wells, removing old deposits of sludge and grease and preventing new organic deposits from forming. Functionally, the use of the present invention effectively turns the collection conduits that lead to the wastewater treatment plant into a "pre-treatment plant digester" so as to eliminate odor, improve water quality and lower the solids and pollutant content of the wastewater that reaches the treatment plant. The use of the present invention in accordance with this method results in reductions in fats, oils and grease (FOG), biological oxygen demand (BOD), chemical oxygen demand (COD), ammonia ($NH_3$), nitrogen or nitrogenous compounds (N), suspended solids (VSS) and/or total solids (TS). When the feeder apparatus is self-powered and self-contained, in accordance with this invention, it may be placed at a remote location in a wastewater line that is devoid of electrical power, to pre-treat the wastewater before it reaches the location at which odor, sludge, or build-up of grease and/or other matter is a problem.

BRIEF DESCRIPTION OF THE DRAWINGS

FIG. 1b is a perspective outside view of the apparatus of this invention;

FIGS. 2a and 2b are front and side elevations, respectively, of the feeder unit;

FIG. 3c is a vertical section along the line 3c—3c of FIG. 2a;

FIGS. 6a and 6b are cut-away side and front elevations, respectively, of a feeder device that incorporates an alternative tapered auger assembly;

FIG. 6c is an enlarged view of the spring coupling of the alternative auger assembly shown in FIGS. 6a and 6b;

FIG. 6d is an enlarged side view of the spring coupling assembly of FIG. 6c, in its relaxed configuration prior to mounting of the auger within the feeder unit;

FIG. 6e is an enlarged view of a portion of FIG. 6a;

FIGS. 7a and 7b are side and exploded views, respectively, of the stirrer assembly;

DESCRIPTION OF THE PREFERRED EMBODIMENTS

Figure 1A:
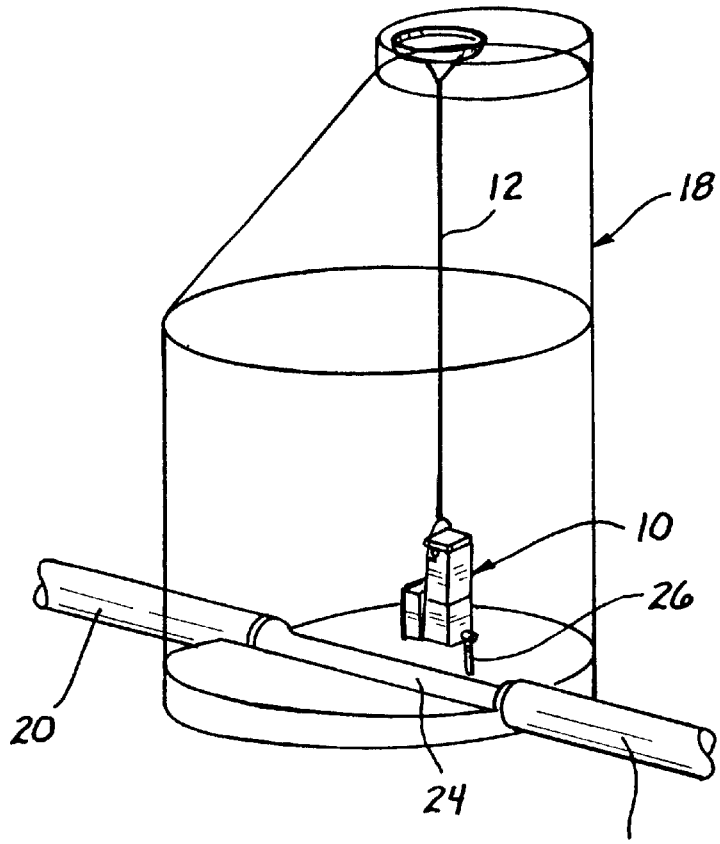
FIG. 1a is a perspective view of the inventive device installed in a manhole.

FIG. 1a illustrates the preferred method of use of the inventive feeder 10. In that figure, the feeder 10 is shown suspended by a chain 12 attached to a bracket 14 inserted into the cover 16 of a manhole 18. Waste water lines 20, 22 are connected at the bottom of the manhole 18 by an open trough 24. The drop pipe 26 directs the microbe powder dispensed by the feeder 10 straight into the waste water which flows through the trough 24.

A. General Structure of the Feeder Apparatus

The feeder 10 is shown in more detail in FIGS. 1b through 3c. The feeder 10 includes a microbe housing 28, an auger housing 30, and an electronics enclosure 32. Microbe powder is discharged from the feeder 10 through the discharge nozzle 34 into the drop pipe 26. The drop pipe 26 has several functions: for one, it prevents lateral splatter of the microbe powder being dispensed and directs it straight into the waste water; and secondly, it assists in keeping humid air away from the discharge nozzle 34 so as to reduce caking at the discharge nozzle 34.

B. Hanger Assembly Useable to Suspend Feeder Apparatus Within a Manhole

The feeder 10 is advantageously suspended in a manhole 18 by a chain 12. The chain may be attached to either an anchoring bolt that has been sunk into the concrete adjacent the wall of the manhole or to an expandable manhole bracket 14 described in more detail below. The chain 12 is preferably made of steel coated with a hydrogen sulfide-resistant plastic to prevent rusting in the corrosive atmosphere of the manhole 18. The feeder 10 is suspended from the chain 12 by a hanger assembly 36 which is threaded through guides 38 to maintain the feeder 10 in a vertical position.

Figure 4C:
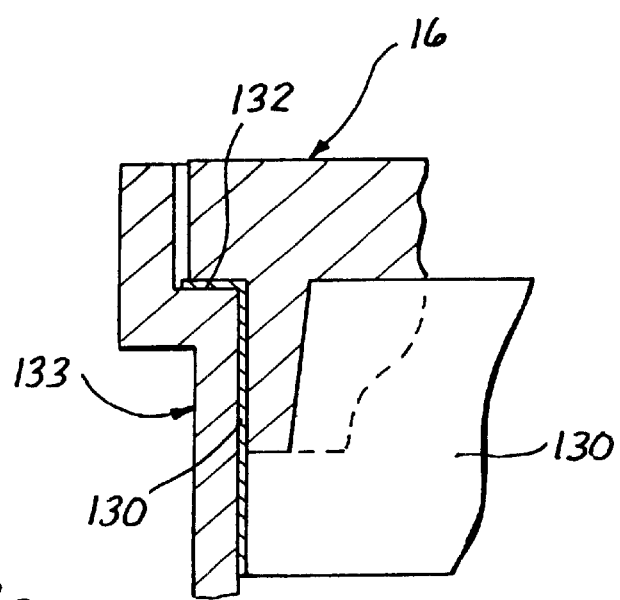
FIGS. 4a, 4b and 4c are plan, side elevation and detail views, respectively, of the manhole bracket and chain.
Figure 4A:
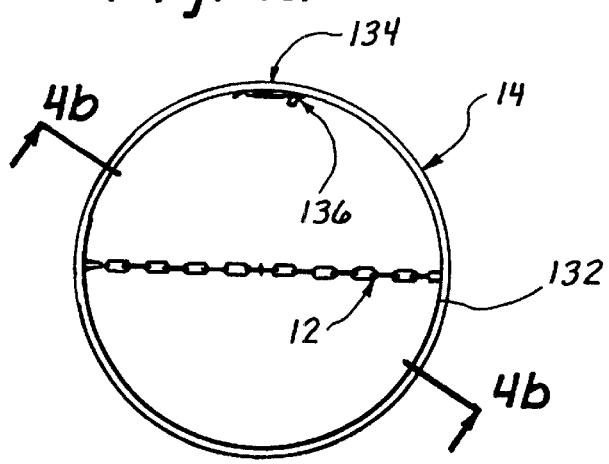
Figure 4B:
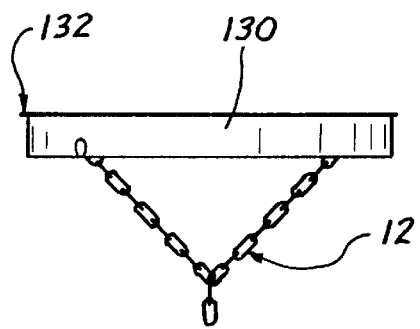

Although the manhole covers 16 are of more or less standard size, the actual size of manhole covers varies somewhat with different manufacturers. Consequently, the bracket 14, as shown in FIGS. 4a through 4c, is preferably a hoop 130 formed of an aluminum sheet which has a short flange 132 that rests on the rim of the ring 133 (FIG. 4c) of the manhole 18 and is held in place by the manhole cover 16. The hoop 130 is cut at 134 (FIG. 4a), and the cut is straddled by a turnbuckle 136 that allows the hoop 130 to be expanded and contracted so as to vary its effective diameter D.

C. The Moisture Impervious Housing of the Feeder Apparatus

Figure 3A:
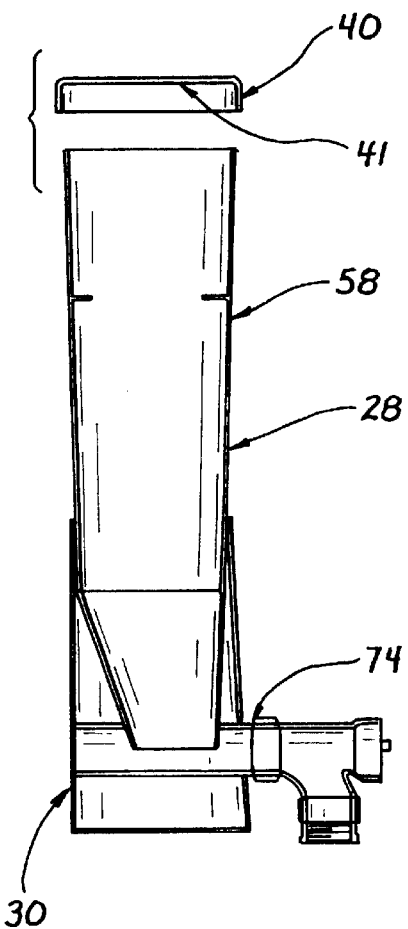
FIGS. 3a and 3b are vertical sections, at right angles to one another, of the microbe housing and auger housing.
Figure 3B:
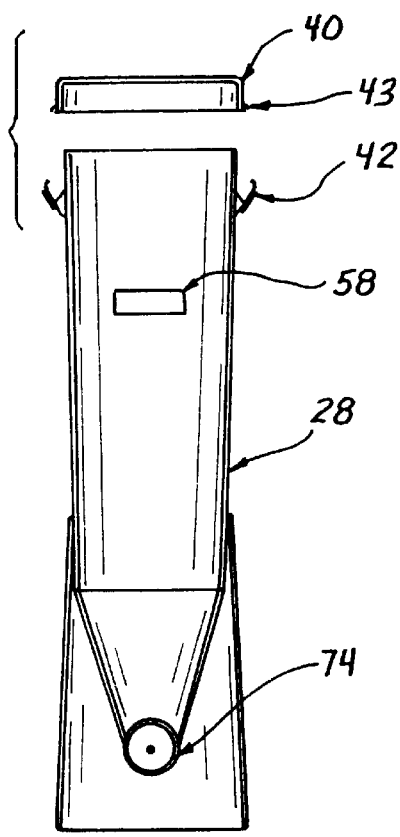

Referring more specifically to FIGS. 3a and 3b, the feeder 10 forms a sealed, substantially moisture impervious enclosure for the feeder mechanisms. The microbe housing 28, auger housing 30 and electronics enclosure 32 (FIGS. 2a and 2b) are all formed of a corrosion-resistant and durable plastic, fiberglass or corrosion-resistant metal such as aluminum or stainless steel. The filter or lid cover is provided with a gasket 41 on its inside and is firmly held on the microbe housing 28 by latches 42 engaging hooks 43. Likewise, the electronics cover 44 is held on the electronics enclosure 32 by latches 46, with a seal formed by gasket ring 48 (FIG. 3c).

D. The Agitator of the Feeder Apparatus

Figure 3C:
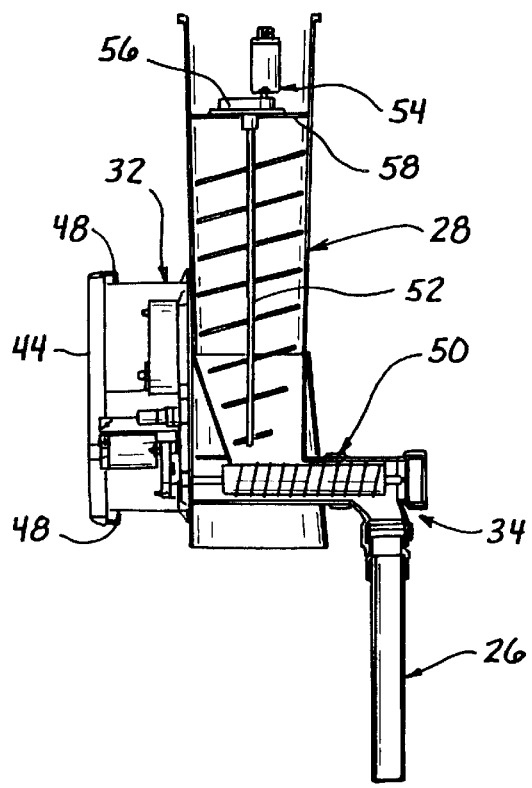

As will be best seen in FIGS. 3b and 3c, the microbe housing 28 is tapered both laterally and longitudinally of the auger 50 (FIG. 3c) so as to contact the upper half of the rear half of auger 50. An agitator 52 is positioned in the microbe housing 28 so as to stir the microbe powder in the housing 28 and prevent it from compacting or adhering to the sides of the housing 28. The agitator 52 is driven by an agitator motor 54 through a speed-reducing gear train 56. The agitator assembly is supported in the microbe housing 28 on shelf brackets 58 which allow loading of microbe powder around the motor 54.

FIGS. 7a and 7b show the details of the agitator assembly. The agitator 52 is attached to the output 88 of gear train 56 by a rigid coupling 90. The gear train 56 supports the gear motor cover 92 which seals the agitator motor 54 against contamination by the microbe powder as well as corrosion from the ambient air. A quick disconnect connector 94 is provided for the agitator motor's power cable.

The gear train 56 is attached to a rectangular mounting strip 96 by screws 98. The mounting strip 96 is in turn attached to the shelf brackets 58 (see FIGS. 3a and 3b) by screws 100. Agitation is accomplished by the inclined arms 102 as they revolve in the microbe powder.

E. Auger Assembly of the Feeder Apparatus i. Non-tapered Auger

Figure 5:
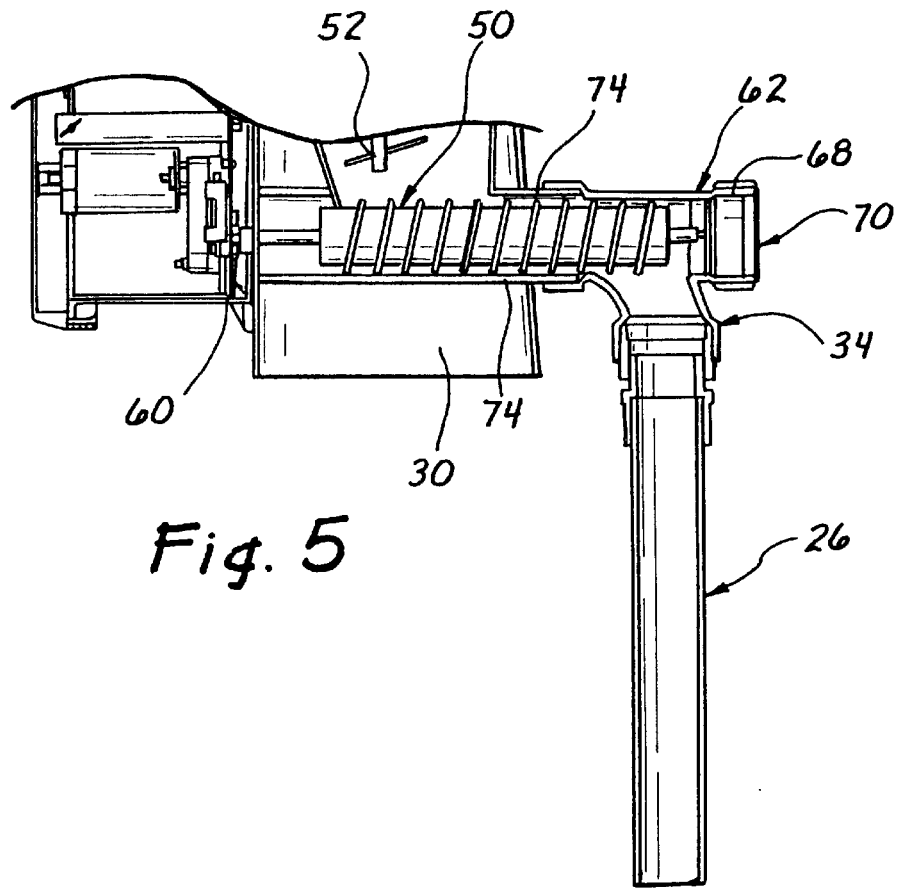
FIG. 5 is an enlarged detail section of the dispensing portion of the feeder of FIG. 3.

FIG. 5 illustrates the mounting of the non-tapered auger 50 in the auger housing 30. The non-tapered auger 50 is supported between a flexible coupling 60 including a rubber coupling member 61 (FIG. 6), and an end retainer 62 in the discharge nozzle assembly 34. The non-tapered auger 50 is driven by auger motor 64 through reduction gear train 66 and flexible coupling 60, and is accessible for cleaning through the maintenance port 68 sealed by end seal 70.

Figure 6:
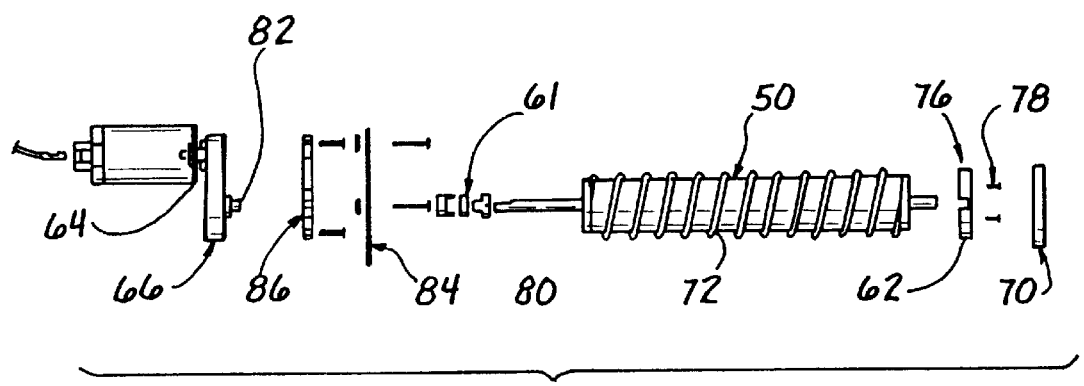
FIG. 6 is an exploded side view of the non-tapered auger assembly.

As shown in the assembly view FIG. 6, the spiral rib 72 (FIG. 6) of the auger 50 picks up microbe powder from the microbe housing 28 and conveys it through conduit 74 to the discharge nozzle 34. Conduit 74 is so dimensioned as to snugly fit around the rib 72. At least one of the conduit 74 and the rib 72 should be formed of a lubricous hard plastic such as Teflon so as to facilitate rotation of the non-tapered auger 50 while preventing air from migrating along auger 50 into the microbe housing 28. To deter caking or clumping of the dry microbial material, the distal portion 51 of the auger 50 located adjacent the outlet opening 35 that leads into down pipe 26, is tapered and devoid of spiral ribs 72 as shown in FIGS. 5 and 6. This substantially smooth, tapered distal portion 51 of the auger 55 does not hold the dry microbial material and this does not become caked or encrusted with the microbial material even though some moisture does enter the distal end of the auger housing 30 though the outlet opening 35.

As best shown in FIG. 6, the non-tapered auger 50 can be removed for cleaning by removing the end seal 70, and loosening the setscrew 76, and pulling the end retainer 62 out of the discharge nozzle assembly 34 by the pull screws 78. The auger 30 can then be grasped and pulled out of the flexible coupling hub assembly 80. The hub assembly 80 is connected to the output 82 of gear train 66 which is attached to the electronic enclosure backplate 84 through the intermediary of gear motor mounting plate 86.

ii. Tapered Auger

FIGS. 6a–6e show a modified device 10a that is essentially the same as the device 10 of FIGS. 1–6, but which incorporates an alternative auger assembly that further deters caking or clumping of the dry microbial preparation about the auger 50a when the device 10a is used in a high humidity environment and facilitates easy removal of the auger for cleaning and/or maintenance.

As shown in FIGS. 6a–6e, a tapered auger 50a is supported at its proximal end by a longitudinally compressible spring coupling 60a that includes a coil spring 100. A set screw member 102 is mounted on one end of the coil spring 100 and a spindle member 104 is mounted on the other end, as shown. The tapered auger 50*a* is driven by an auger motor 64 through reduction gear train 66 and spring coupling 60. The distal end of the tapered auger 50*a* is rotatably engaged to and supported by the stationary, non-rotating end member 106. The end member 106 is positioned within the distal portion of the auger housing, on the other side of the outlet opening 36. Annular o-ring groves are formed about the outer surface of the end member 106 and o-rings 108 are seated in the grooves to maintain a substantially air tight and substantially moisture impervious seal at the end cap.

As shown in FIGS. 6*a* and 6*e*, the helical rib 72*a* of the tapered auger 50*a* picks up dry microbial treatment material from the housing 28 and conveys it through conduit 74 to the discharge nozzle 34. Conduit 74 is so dimensioned to snugly fit around the rib 72*a*. The conduit 74 and/or the rib 72*a* may be formed of a lubricious hard plastic such as polytetrafluoroethylene (Teflon) to facilitate rotation of the tapered auger 50*a* while preventing air from migrating along the tapered auger 50*a* into the housing 28. To deter caking or clumping of the dry microbial treatment material, the distal portion 51 of the tapered auger 50*a* located adjacent the outlet opening 35 that leads to the down pipe 26, is tapered and devoid of the helical ribs 72*a*. This substantially smooth, tapered distal portion 51 of the tapered auger 50*a* tends not to hold a build-up of the dry microbial treatment material, even in instances where some moisture does enter the distal region of the auger housing 30 through the outlet opening 35.

F. Electronics of the Feeder Apparatus

Figure 8:
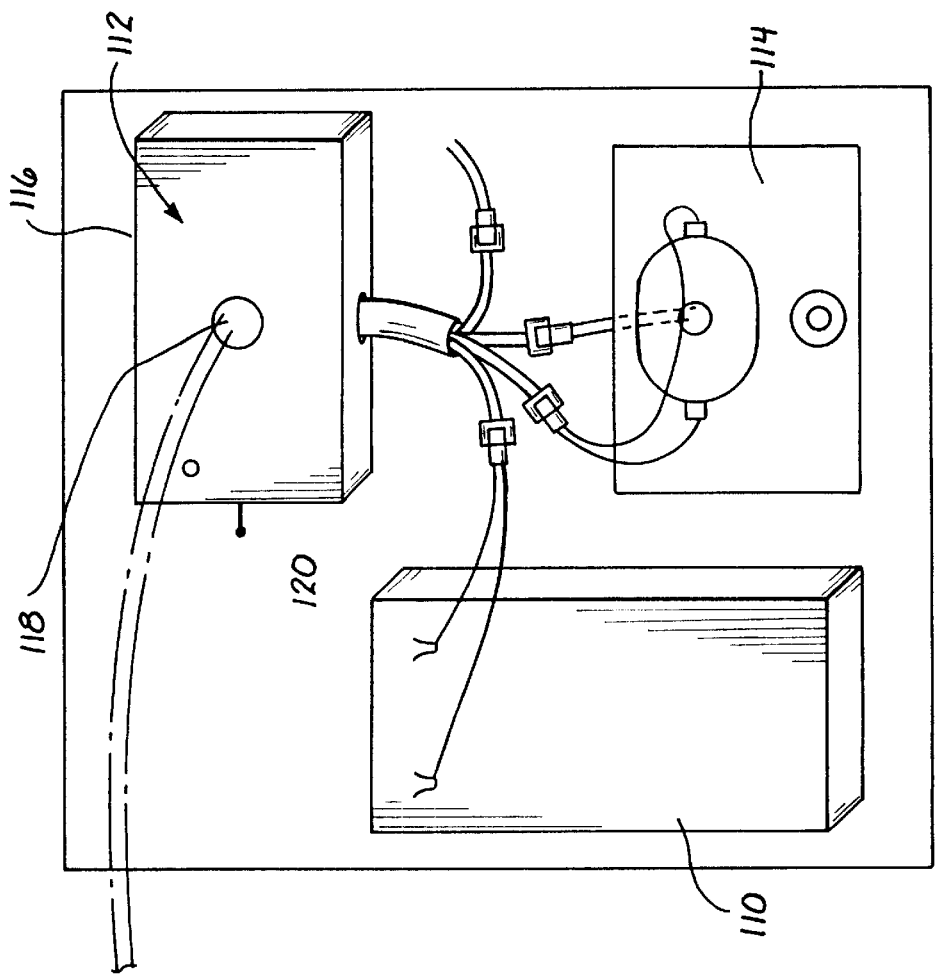
FIG. 8 is a schematic diagram of the battery, microprocessor controller and auger drive motor as mounted within the feeder.

The electronics enclosure 32 has a hinged cover 44 equipped with a seal 48 to seal the electronics in the enclosure 32 against the humid and corrosive atmosphere of the manhole 18, when the cover 44 is secured by the latches 101. As best seen in FIG. 8, when the hinged cover 44 is removed from the electronics enclosure 32, one can view the battery 110, microprocessor controller 112 and auger drive motor 114. The motor 114 is preferably a 12 volt DC motor of the type commercially available as Model #4Z839 from Dayton Electric Mfg. Co., Niles, Ill. As an alternative to a motor various other drive apparatus may be used. For example, a pneumatic turbine or pneumatic drive may be provided, and such pneumatic drive may be powered by a cylinder of compressed gas attached to the feeder or my a small compressor that is powered by an independent battery-powered motor.

Figure 9:
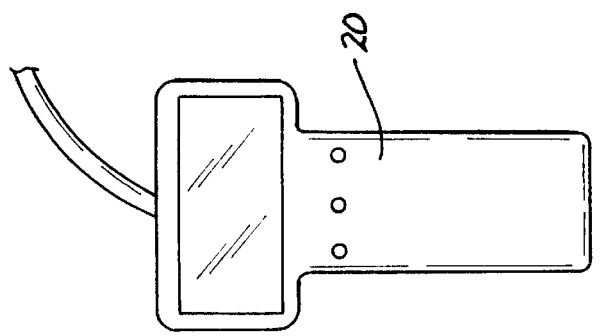
FIG. 9 is a front view of a hand held apparatus that is connectable to the microprocessor controller of the feeder to monitor its performance and to effect changes in the operator input settings of the controller.

The microprocessor controller 112 is preferably mounted within a substantially air-tight container 116 to prevent moisture from entering the controller 114 as to cause shorting or deterioration of the controller's circuitry or components. As shown, the controller 114 is connected by wires to the battery 110, auger drive motor 114 and mixer drive motor 54 (shown in FIG. 3*c*) and to a once-around switch that is connected to the microprocessor so as to signal the microprocessor each time the auger 50, 50*a* has made a full rotation. A removable cap 118 is formed on the controller's air-tight container 116 to permit a hand held remote control apparatus 120 (shown in FIG. 9) to be operatively connected to a jack or interface connector formed on the controller 114. When so connected to the controller 114, the hand held remote control apparatus 120 is useable to program the controller with the variables:( e.g., the amount or dose of the dry microbial treatment material to be added to the wastewater stream in each 24 hour period). After the controller has been programmed with the operator-set variables, the hand held remote control apparatus 120 is disconnected, the cap 118 is replaced, and the hinged cover 44 is replaced on the electronics enclosure 32.

Thereafter, the desired dry microbial treatment material is placed in the microbe housing 28 and the lid 40 is secured to the microbe housing 28 to exclude moisture from the interior of the housing 28. The feeder is turned on and suspended within a manhole as described hereabove. Thereafter, the microprocessor controller 114 will emit control signals to cause the mixer drive motor 52 and auger drive motor 114 to run for timed intervals to deliver into the flowing wastewater stream the amount of microbial treatment material dictated by the operator-input variables that had been programmed into the controller 114.

In the particular embodiment shown, a manual test switch 120 is located on the side of the controller 112 and extends through the air-tight enclosure 116. This test switch 120 may be moved manually from its off position to either of two active positions. In one active position, the test switch 120 initiates a "run test" wherein the auger 50, 50*a* runs for a predetermined number of rotations. In the other active position, the test switch 120 initiates a battery test wherein either a first indicator light (e.g., a green light) comes on to indicate that sufficient battery voltage remains or a second indicator light (e.g., a red light) comes on to indicate that insufficient battery voltage remains.

The Method of the Present Invention

Because the above-described feeder device 10 of the present invention is a self-contained, battery powered device that is specifically constructed to be suspended within a manhole in an area that is devoid of any electrical power source and devoid of any above-ground storage structure. As such, the feeder device 10 is useable in ways that the prior-art devices were not. For example, as shown in FIG. 10 the feeder apparatus 10 of the present invention may be used to pre-treat wastewater at a location or locations upstream of wet well(s), lift station(s), pumping station(s), or other locations where odor, grease build up or other microbial-induced problems are present.

Figure 10:
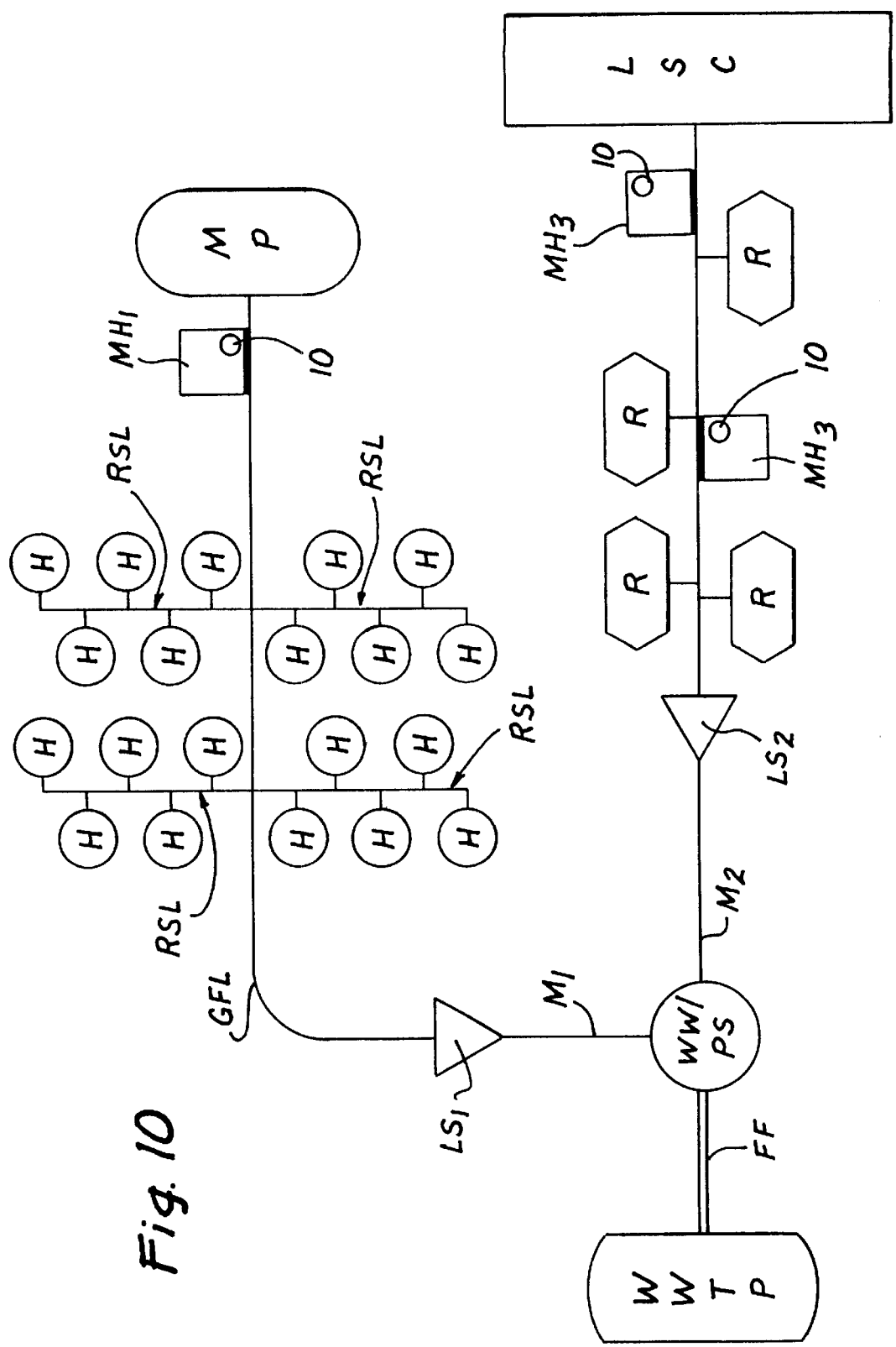
FIG. 10 is a schematic drawing of a municipal wastewater treatment system, having feeder devices of the present invention positioned at various locations in accordance with the method of this invention.

FIG. 10 shows an example of a municipal waste water treatment system wherein wastewater from various regions of the municipality is transported through the municipal piping system, to a waste water treatment plant WWTP as shown. A large force main FM carries the bulk of waste water from a main wet well/pumping station WW/PS. The wet well/pumping station WW/PS receives wastewater from two (2) separate mains $M_1$ and $M_2$. The first main $M_1$ extends from a first lift station $LS_1$ to the wet well/pumping station WWPS. A gravity feed line GFL carries wastewater into the first lift station $LS_1$. A manufacturing plant MP located in an outlying area at the end of the first gravity feed line $GL_1$ emits wastewater that is high in organic content and thus is likely to become odorous when stagnant or placed under conditions whereby free oxygen is occluded as to promote the growth of anaerobic organisms. A number of residential homes H emit the usual volumes of human waste and other residential sewage, all of which is carried by residential sewage lines RSL into the first gravity feed line $GFL_1$. Wastewater from the first gravity feed line $GFL_1$ becomes pooled in a below ground collection well located within the lift station $LS_1$. When the level of wastewater within that containment well exceeds a predetermined amount, a lift pump is actuated to pump the sewage into the first main $M_1$ whereby it undergoes further gravity drainage into the wet well/pumping station WW/PS. Because of the pooling of wastewater that takes place within the first lift station $LS_1$, and because of the large amount of organic contents emitted by the manufacturing plant combined with the human waste and other residential sewage from the homes, there is a tendency for odor to be emitted at the location of the first lift station $LS_1$. Although a first manhole $MH_1$ is located in the distal portion of the first gravity feed line $GFL_1$ such manhole $MH_1$ is devoid of electrical power and, thus, could not be used as a location for stationing a power-requiring bioremediation feeder of the prior art. Because of this, it would be necessary to locate the prior art bioremediation feeder at a location that was supplied with electrical power, such as within the first lift station $LS_1$. However, because the anaerobic microbial processes that are causing the odor within the first lift station $LS_1$ are actually begun before the wastewater reaches the first lift station $LS_1$, the application of bioremediation chemicals to the wastewater at the location of the first lift station $LS_1$ is less than fully effective in treating the odor because, at that point, the odor has already developed. However, in accordance with the present invention, a self-contained feeder device 10 of the present invention may be placed in the first manhole $MH_1$ near the location of the manufacturing plant MP so as to continually meter solid bioremediation material into the wastewater entering the first gravity feed line $GFL_1$ from the manufacturing plant MP. In this manner, the biological treatment of the wastewater is begun well upstream of the first lift station $LS_1$ and continues in effect as the wastewater from the manufacturing plant MP becomes mixed with the residential waste from the homes H. Thus, the odor that was previously notable at the location of the first lift station $LS_1$ is eliminated by microbial pretreatment of the wastewater stream and removal of old or pre-existing organic matter that has become deposited on gravity feed lines, well upstream of the first lift station $LS_1$.

The second main $M_2$ leads from a second lift stations $LS_2$ to the wastewater/pumping station WWPS. The second lift station $LS_2$ receives wastewater from a second gravity feed line $GFL_2$ located in a commercially-zoned area of the city. This second gravity feed line $GFL_2$ receives wastewater from a large shopping center LSC as well as a number of restaurants R. The restaurants R have been known to emit large amounts of grease and other organic matter which becomes combined with a variety of other wastewater from the large shopping center LSC within the gravity feed line $GFL_2$. As a result, large amounts of grease have traditionally built up in the second lift station $LS_2$ as the wastewater from the second gravity feed line $GFL_2$ becomes pooled in that second lift station $LS_2$. Such grease can actually form a covering or "grease mat" on the surface of the pooled wastewater within the second lift station $LS_2$ thereby excluding oxygen from the wastewater and promoting anaerobic processes within the wastewater. Such anaerobic processes give rise to further odor problems at the location of the second lift station $LS_2$. Although two manholes MH are located on the second gravity feed line $GFL_2$, such manholes are devoid of electrical power and, thus, cannot be used as locations for stationing bioremediation feeder devices that require an independent source of electrical power. In the past, a liquid bioremediation feeder could have been located within the second lift station $LS_2$ where there is a source of electrical power and the required above-ground storage structure, but such positioning of the liquid bioremediation feeder would likely have failed to eliminate the problem of grease build up and/or odor at the second lift station $LS_2$. This is due to the fact that the grease and organic matter emitted by the restaurant and shopping center have already begun to undergo anaerobic decomposition within the second gravity feed line $GFL_2$ and the addition of the bioremediation material at the location of the second lift station $LS_2$ is less than fully effective because it is being added too late in the process of the anaerobic decomposition. However, when self-contained feeder devices 10 of the present invention are located in the manholes MH2 and MH3 on the second gravity feed line $GFL_2$, the problems of grease build up and odor at the second lift station $LS_2$ are eliminated due to the fact that controlled amounts of solid bioremediation material have been consistently fed into the wastewater flowing through the gravity feed line $GFL_2$ well upstream of the second lift station $LS_2$. This affects a pretreatment of the wastewater before it reaches the second lift station $LS_2$ where the problems of grease build up and odor had been previously noted.

It is to be understood that the exemplary volumetric feeder for solid bioremediation materials described herein and shown in the drawings represents only a presently preferred embodiment of the invention. Indeed, various modifications and additions may be made to such embodiment without department from the spirit and scope of the invention. For example, a control panel may be formed directly on the feeder device in lieu of the detachable hand-held remote control apparatus 120 shown in the drawings. Similarly, instead of an auger type feeder for delivering dry powder or pellets, various other dosage forms and feeder mechanisms may be used. For example, in lieu of the auger shown in the drawings, the device 10 could comprise a) a motorized roll of paper or interconnected packets that contain the dry microbial treatment preparation and b) an automatic knife or severing apparatus, such that desired lengths of paper or a desired number of the interconnected packets would be periodically or continuously payed-out, severed or cut off, and dropped into the wastewater stream. Also, other modifications and additions may be obvious to those skilled in the art and may be implemented to adapt the present invention for use in a variety of different applications.

What is claimed is:

1. A method treating wastewater flowing in a sewer that has a manhole formed therein, said method comprising the steps of:

a) suspending in said manhole a self-powered feeder;

b) placing a solid microbe-containing wastewater treatment substance into said feeder;

c) automatically dispensing a predetermined quantity of said substance from said feeder into said waste water.

2. The method of claim 1, wherein at least the portion of said feeder in which said substance is contained is substantially impervious to moisture.

3. The method of claim 1, wherein said substance is dispensed by an auger that transports said substance from the interior of said feeder to an outlet opening through a conduit that is substantially sealed so as to prevent moisture from causing caking of the substance about said auger.

4. The method of claim 1, wherein said feeder is programmable such that the interval and quantity of substance delivered are adjustable.

5. Wastewater treatment apparatus for use in manholes, comprising:

a) a self-powered feeder including:

i) a housing for storing a solid particulate water-treating microbe-containing substance;

ii) an outlet through which said substance may pass out of said housing;

iii) a dispensing apparatus arranged to convey said substance from said housing to said outlet;

iv) a drive apparatus arranged to drive said dispensing apparatus;

v) a controller that is programmable to operate said drive apparatus for predetermined lengths of time at predetermined intervals; and vi) a battery arranged to power said controller circuit; and, b) a support apparatus for supporting said feeder in said manhole.

6. The apparatus of claim 5, in which said housing is substantially impervious to moisture.

7. The apparatus of claim 5, in which said feeder further includes:

vii) an agitator in said housing so shaped and dimensioned to prevent said substance from caking within said housing; and viii) an agitator motor arranged to drive said agitator.

8. The apparatus of claim 7, in which said agitator motor and said drive apparatus said dispensing apparatus always run concurrently.

9. The apparatus of claim 5, in which said dispensing apparatus is an auger.

10. The apparatus of claim 9, in which said auger dispenses said substance through a conduit which engages said auger with sufficient lubricity to allow said auger to rotate in said conduit but with sufficient tightness to prevent migration of moisture along said conduit.

11. The apparatus of claim 5, in which said feeder further includes:

ix) an elongated drop pipe extending downwardly from said discharge nozzle.

12. The apparatus of claim 5, in which said support apparatus for supporting includes:

i) an engaging member configured to engage the rim of said manhole; and ii) a suspending member attached to said engaging member to support said feeder suspended therefrom.

13. The apparatus of claim 12, in which said engaging member is split and expandable to fit manholes of different diameters.

14. The apparatus of claim 12, in which said suspending member is a chain coated with a corrosion-resistant material.

15. The apparatus of claim 5, in which said controller is adapted to periodically start and stop the drive apparatus to thereby deliver a desired dosage of the microbial treatment substance into the wastewater.

16. The apparatus of claim 15, in which the frequency with which the controller starts and stops the drive apparatus is adjustable.

17. The apparatus of claim 15, in which said controller further provides indications of the total run time of the drive apparatus and the total intervals between runs of the drive apparatus.

18. The apparatus of claim 3, wherein the auger is rotatably mounted within said conduit and an access opening is formed in said conduit, said access opening being sealed by a removable cover, said cover being removable to permit access into said conduit through said access opening thereby allowing the auger to be cleaned or serviced at the site of operation.

19. The apparatus of claim 3 wherein said conduit has a proximal end and distal end and wherein said outlet opening is formed adjacent the distal end of said conduit, and wherein said auger has a proximal end and a distal end that is substantially smooth and tapered, said auger being positioned within said conduit such that its distal end is located adjacent to said outlet opening.

20. A method of treating wastewater in a wastewater collection system or treatment plant where an odor and/or build-up of solid matter and/or acidic corrosion and/or septic condition has occurred at a first location due at least in part to the presence of anaerobic microbes, grease or organic matter upstream of that first location, said method comprising the steps of:

a) providing a self-powered feeder apparatus for delivering a predetermined dose of a dry particulate wastewater treatment preparation that contains aerobic facultative organisms;

b) loading a quantity of said wastewater treatment preparation into said feeder;

c) placing the feeder at a second location upstream of the first location; and, d) causing the feeder to deliver a predetermined dose of the wastewater treatment preparation into the wastewater at the second location, thereby promoting an aerobic facultative process in wastewater upstream of the first location and resulting in a decrease in the odor and/or solid matter and/or acidic corrosion and/or septic condition at the first location.

21. The method of claim 20 wherein the first location is selected from the group consisting of:

a wet well;

a lift station;

a force main;

a siphon;

a pumping station;

a wastewater line;

a wastewater line having relatively low flow velocity;

a wastewater line having a dip or belly formed therein;

a wastewater line having a slime layer deposited therein;

a location that receives higher than normal amounts of grease;

a location at which a grease mat has formed; and, a location in which wastewater becomes pooled.

22. The method of claim 20 wherein the second location is selected from the group consisting of:

a manhole located upstream of the first location;

a wastewater line located upstream of the first location;

a lift station located upstream of the first location;

a wet well located upstream of the first location; and, a pumping station located upstream of the first location.

23. The method of claim 20 wherein the second location is devoid of any source of electrical power and the feeder apparatus provided in step A is self-powered so as to operate at said second location in the absence of any other source of electrical power.

24. The method of claim 20 wherein the second location is devoid of any above ground storage structure and the feeder apparatus provided in step A is adapted to deliver a dry microbial treatment preparation that does not require above ground storage.

25. The method of claim 20 wherein the second location is devoid of any water supply and the feeder apparatus provided in Step A is adapted to deliver a dry microbial treatment preparation that does not require above ground storage.

26. The method of claim 20 wherein the second location is within a manhole that has a manhole cover, and wherein Step C further comprises attaching said feeder to the periphery of the manhole or the manhole cover such that the feeder is positioned within the manhole.

27. The method of claim 20 wherein the second location is within a manhole having a manhole cover and wherein the feeder provided in Step A further comprises a suspension bracket for suspending the feeder beneath the manhole cover, and wherein Step C of the method further comprises installing the suspension bracket and attaching the feeder to the suspension bracket.

28. The method of claim 20 wherein the feeder apparatus provided in Step A comprises:
   i) a housing for storing a quantity of the dry particulate wastewater treatment preparation;
   ii) an outlet through which the wastewater treatment preparation may pass out of said housing;
   iii) a dispensing apparatus arranged to convey the wastewater treatment preparation from said housing to said outlet;
   iv) a motor arranged to drive said dispensing apparatus; and
   v) a controller that is programmable to operate said motor for predetermined lengths of time at predetermined intervals; and
   vi) a battery arranged to power said motor and said controller;
and wherein Step D further comprises:
   causing the controller to operate the motor to deliver a desired dose of the dry particulate wastewater treatment preparation out of the outlet
   and into the wastewater at the second location.

29. The method of claim 26 wherein high ambient humidity is common at the second location and wherein the housing of the feeder provided in Step A is substantially impervious to moisture, thereby preventing the ambient humidity from causing caking or clumping of the wastewater treatment preparation within the feeder.

30. The method of claim 28 wherein the feeder provided in Step A further includes:
   vii) an agitator in said housing so shaped and dimensioned to prevent said substance from caking within said housing;
   viii) an agitator motor arranged to drive said agitator;
and wherein Step D of the method further comprises:
   operating the agitator at least some of the time to prevent caking of the treatment preparation within the feeder.

31. The method of claim 28 wherein the controller of the device provided in Step A is adapted to cause the agitator motor to run concurrently with the motor driving said dispensing apparatus and wherein Step C further comprises causing the agitator to agitate the dry particulate wastewater treatment preparation contained within the housing while the dispensing apparatus is conveying the dry particulate wastewater treatment preparation out of the outlet.

32. The method of claim 28 wherein the dispensing apparatus of the feeder provided in Step A is an auger positioned within a conduit that leads to the outlet.

33. The method of claim 32 wherein Step D further comprises causing the auger to convey a quantity of dry particulate wastewater treatment preparation through the conduit.

34. The method of claim 26 wherein the feeder provided in Step A includes:
   an elongated drop pipe extending downwardly from a discharge nozzle;
and wherein Step D further comprises:
   causing the dry particulate wastewater treatment preparation to be delivered through the drop pipe.

35. The method of claim 20 wherein the feeder provided in Step A further comprises:
   vii) an engaging member configured to engage the rim of said manhole; and
   viii) a suspending member attached to said engaging member to support said feeder suspended therefrom;
and wherein Step C further comprises:
   mounting the engaging member such that it engages the rim of a manhole at the second location; and,
   attaching the feeder to the suspending member such that the feeder is suspended within the manhole.

36. The method of claim 26 wherein the engaging member provided in Step A comprises a member that is adjustable to fit the size of the manhole at the second location.

37. The method of claim 35 wherein the suspending member provided in Step A is a chain coated with a corrosion-resistant material.

38. The method of claim 32 wherein the auger of the feeder provided in Step A is rotatably mounted within the conduit and an access opening is formed in said conduit, said access opening being sealed by a removable cover, said cover being removable to permit access into said conduit through said access opening;
and wherein the method further comprises the step of:
   e) removing the cover from the access opening and checking the auger through said access opening while a quantity of dry aprticulate wastewater treatment preparation remains in the feeder housing.

39. The method of claim 20 wherein the feeder provided in Step A further comprises a hand held remote control apparatus that is connectable to and disconnectable from the controller hand held remote control apparatus being useable to adjust the controller in a manner that changes the dose of dry particulate wastewater treatment preparation delivered into the wastewater by the feeder;
and wherein the method further comprises the steps of:
   attaching the hand held remote control apparatus to the feeder;
   using the hand held remote control apparatus to adjust the controller in a manner that changes the dose of dry particulate wastewater treatment preparation delivered into the wastewater by the feeder; and,
   disconnecting the hand held remote control apparatus from the feeder.

40. The method of claim 26 wherein the feeder provided in Step A further comprises a hand held remote control apparatus that is connectable to and disconnectable from the controller hand held remote control apparatus being useable to test the battery of the feeder apparatus;
and wherein the method further comprises the steps of:
   attaching the hand held remote control apparatus to the feeder;
   using the hand held remote control apparatus to test the battery of the feeder; and,
   disconnecting the hand held remote control apparatus from the feeder.

* * * * *